(12) United States Patent
Wechsler

(10) Patent No.: US 9,322,661 B2
(45) Date of Patent: Apr. 26, 2016

(54) GEOMETRIC DETERMINATION OF SHARED TRAVEL ROUTES

(71) Applicant: Sam Wechsler, Troy, NY (US)

(72) Inventor: Sam Wechsler, Troy, NY (US)

(*) Notice: Subject to any disclaimer, the term of this patent is extended or adjusted under 35 U.S.C. 154(b) by 274 days.

(21) Appl. No.: 13/939,541

(22) Filed: Jul. 11, 2013

(65) Prior Publication Data

US 2015/0019757 A1    Jan. 15, 2015

(51) Int. Cl.
*G06F 15/173* (2006.01)
*G01C 21/34* (2006.01)
*G08G 1/01* (2006.01)
*H04L 12/733* (2013.01)

(52) U.S. Cl.
CPC .......... *G01C 21/3438* (2013.01); *G08G 1/0104* (2013.01); *G08G 1/0141* (2013.01); *G08G 1/0145* (2013.01); *H04L 45/126* (2013.01)

(58) Field of Classification Search
CPC .. H04L 45/126; G08G 1/0104; G08G 1/0145; G08G 1/0141
See application file for complete search history.

(56) References Cited

U.S. PATENT DOCUMENTS

| 7,720,630 B1* | 5/2010 | Miller et al. ................. 702/150 |
| 2010/0332132 A1* | 12/2010 | Okude et al. ................. 701/210 |
| 2015/0160023 A1* | 6/2015 | Goel et al. ................... 709/244 |

* cited by examiner

*Primary Examiner* — Yves Dalencourt
(74) *Attorney, Agent, or Firm* — Heslin Rothenberg Farley & Mesiti P.C.

(57) ABSTRACT

A method, computer program product, and computer system are provided for determining a convenient route. The method includes, for instance: obtaining, by a processor, a route that includes a starting point and an ending point; analyzing the route to determine whether at least one stored route is within a pre-defined acceptance zone of the route; and responsive to determining that at least one stored route is within a pre-defined acceptance zone, assigning a convenience factor of the at least one stored route relative to the route.

18 Claims, 14 Drawing Sheets

300

400

GEOMETRIC DETERMINATION OF SHARED TRAVEL ROUTES

BACKGROUND

An aspect of the technique relates to enabling individual travelers to maximize resources, including but not limited to time and capital, while improving efficiency in locating an effective travel plan.

Throughout the world, people tend to travel independently, without knowing one another's routes. When people share routes they can potentially gain time and save money, but they can potentially sacrifice the convenience of riding alone. An aspect of the technique evaluates potential routes of travel and recommended only geographically convenient routes, while filtering inconvenient routes.

BRIEF SUMMARY

Shortcomings of the prior art are overcome and additional advantages are provided through the provision of a method for determining a convenient route. The method includes, for instance: obtaining, by a processor, a route wherein said route comprises a starting point and an ending point; analyzing the route to determine whether at least one stored route is within a pre-defined acceptance zone of the route; and responsive to determining that at least one stored route is within a pre-defined acceptance zone, assigning a convenience factor of the at least one stored route relative to the route.

Computer systems and computer program products relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

The technique represents an improvement over prior systems and methods of recommending shared travel routes for different users because it evaluates available shared travel routes within a configurable convenience tolerance and recommends available shared travel routes in a user-friendly manner where the user comprehends resource to convenience trade-offs. This consolidation of travel is commonly referred to as "ride-sharing."

Figure 1:
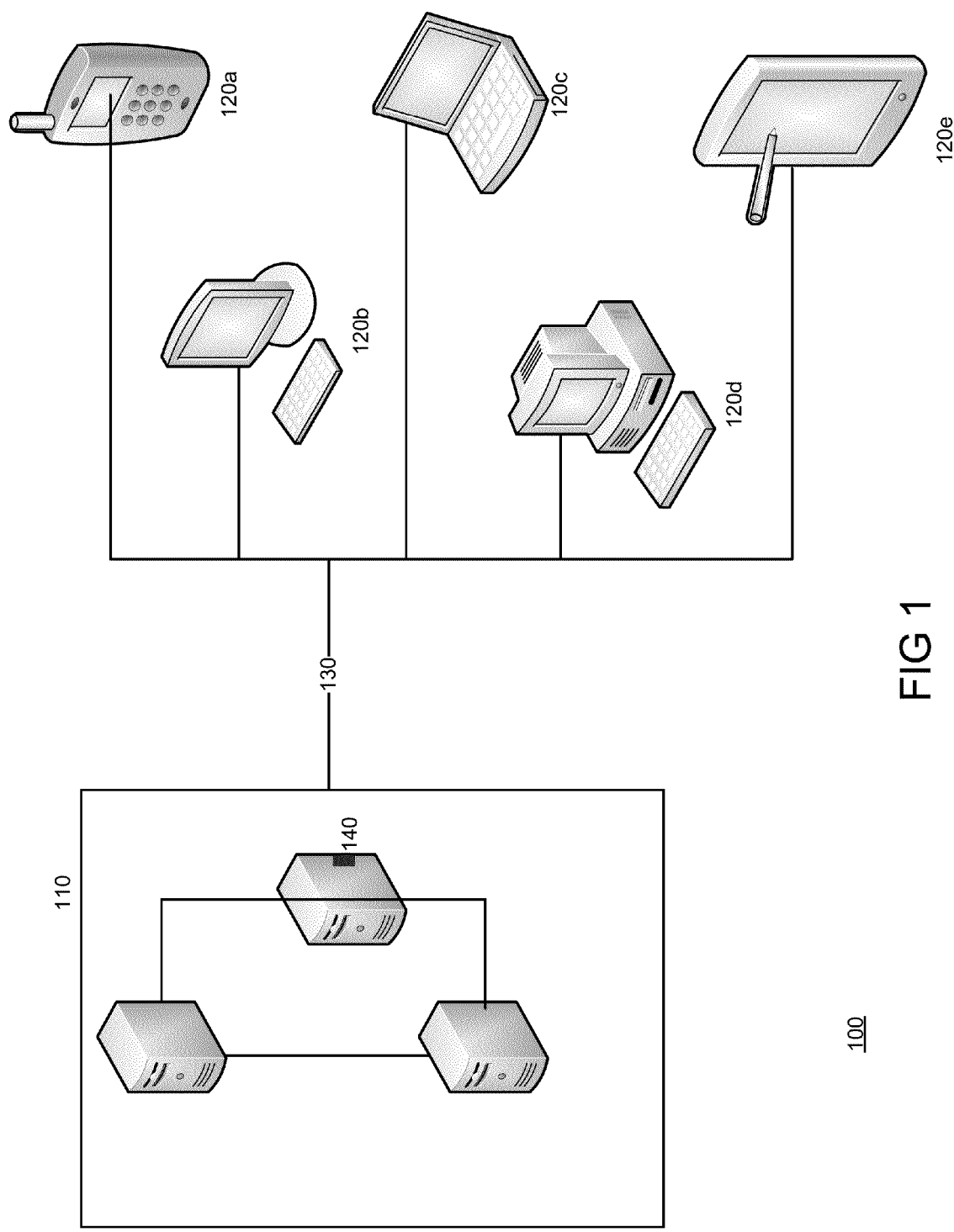
FIG. 1 depicts one example of a computing environment used to execute one or more aspects of an embodiment of the present invention.

FIG. 1 depicts one example of a computing environment 100 used to execute one or more aspects of an embodiment of the present invention. In this embodiment, a computer system 110, which can include a cloud and/or an enterprise system, is accessible by one or more terminals 120a-120e. Computer system 110 can also be a single computer resource. The terminals access the one or more resources of the computer system 110 via a network connection 130, including but not limited to a LAN, a WLAN, and/or an Internet connection.

In this embodiment, computer system 110 contains one or more servers, such as web servers, that serve content to the terminals 120a-120e over the network connection 130.

In this embodiment, each of the terminals 120a-120e includes at least one processor (not pictured) and at least one memory resource (not pictured). The terminals 120a-120e are capable of executing a client program on the terminals 120a-120e, including but not limited to a thin client, such as a web browser, which users of the terminals 120a-10e utilize to interact with a client application 140 executed on one or more resources of the computer system 110. In this embodiment, the client application 140, which is comprised of computer readable program code, is depicted as residing on one of the resources of the computer system 110. The terms "computer readable program code" and software are used interchangeably and both refer to logic executed by processing circuits on computer resources.

In further embodiments of the present invention, the client application 140 is installed on one or more resources of the computer system 110 and/or one or more computer resources accessible to one or more resources of the computer system 110.

A user utilizing a terminal 120a-120e uses the present technique to search for a shared route for a trip that he or she is planning on taking. By sharing a ride with another individual who is planning a different trip, the two individuals can combine resources. The computing environment 100 of FIG. 1 is utilized to practice an aspect of the technique described in FIG. 2.

In an aspect of the present technique, a processor executing computer program code treats routes associated with trips as vectors, each having a magnitude and direction. Users utilize terminals 120a-120e to enter desired routes, by entering at least a starting point and an ending point, and to search for convenient routes. When a given user enters a route, the computer program code retains the route on an accessible memory resource. The processor executing computer program code identifies whether a given route is convenient by comparing the angle and length of the entered route's vector with the angles and lengths of other route vectors retained in the memory resource. The routes that the computer program code executing on one or more processors deems convenient are displayed to a user on a terminal 120a-120e.

In an embodiment of the present invention, the memory resource includes, but is not limited to, a database, and includes both local and/or remote database to the one or more resources in the computer system 110 executing this program code.

When evaluating and identifying whether a potential route stored on a memory resource is convenient, as compared with a newly entered route, the computer program code identifies if the angle of the entered route has a similar angle to other routes in the memory resource, and the length of the entered route is similar to other routes in the memory resource, plus the lengths of the "out of the way" routes then the route will be considered convenient. The computer program code quantifies the convenience of the route by dividing the searched route length by the route length in the memory resource and adding the "out of the way" route lengths. The method is described in greater detail in FIGS. 2-10.

Figure 2:
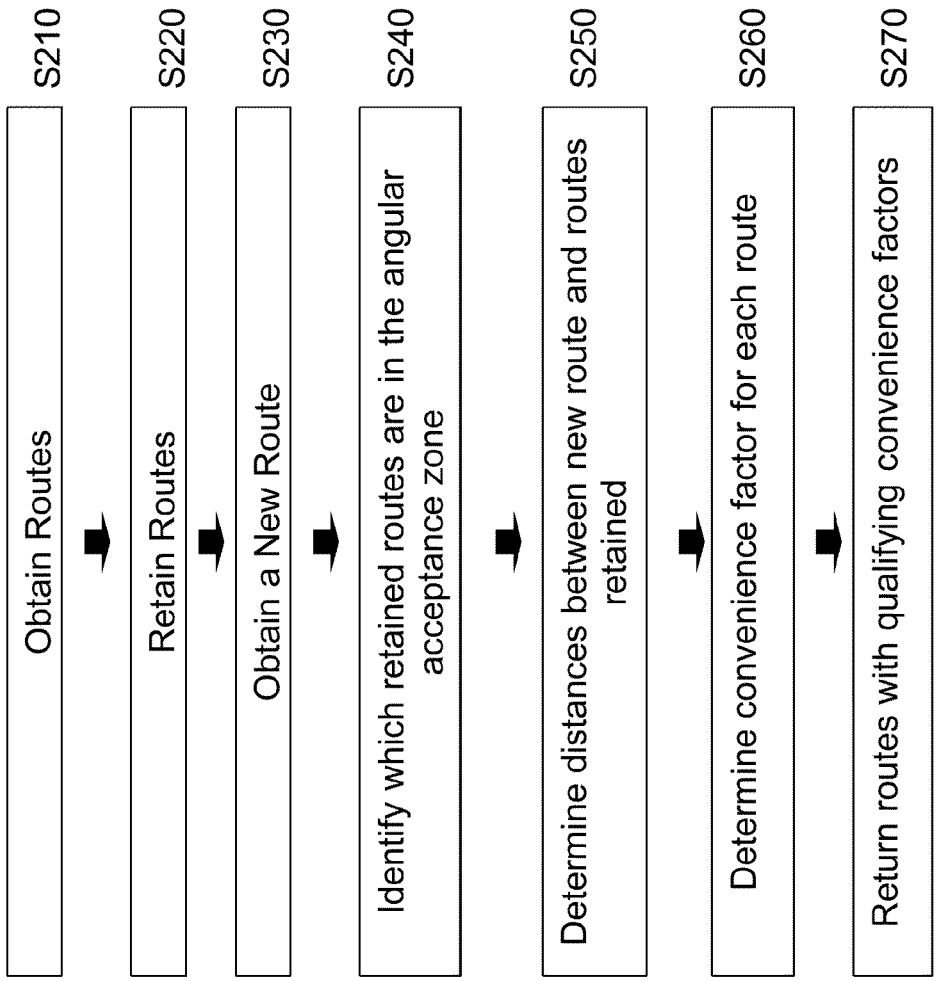
FIG. 2 depicts a workflow of one embodiment of a method for locating a shared route for a traveler, in accordance with one or more aspects of the present invention

As displayed in FIG. 2, a method 200 of an embodiment of the present invention includes, the computer program code obtaining routes entered on terminals 120a-120e by users (S210). The routes represent desired trips that these travelers wish to take. The travelers, for the sake of conserving resources, hope to share travel resources, such as a car, with other travelers. Sharing of routes includes, but is not limited to, two travelers traveling together and a traveler transporting entities for another traveler.

The computer program code then retains these routes (S220). In an embodiment of the present invention, the computer program code retains each route as a vector with a length and a direction.

The computer program code obtains a new route (S230). This new route can be entered, for example, by a user employing a terminal 120a-120e.

The computer program code compares the new route to the retained routes and identifies which on the retained routes are within an angular acceptance zone (S240) as compared to the new route. This analysis and the angular acceptance zone are discussed in greater detail in FIGS. 5-6.

Figure 9:
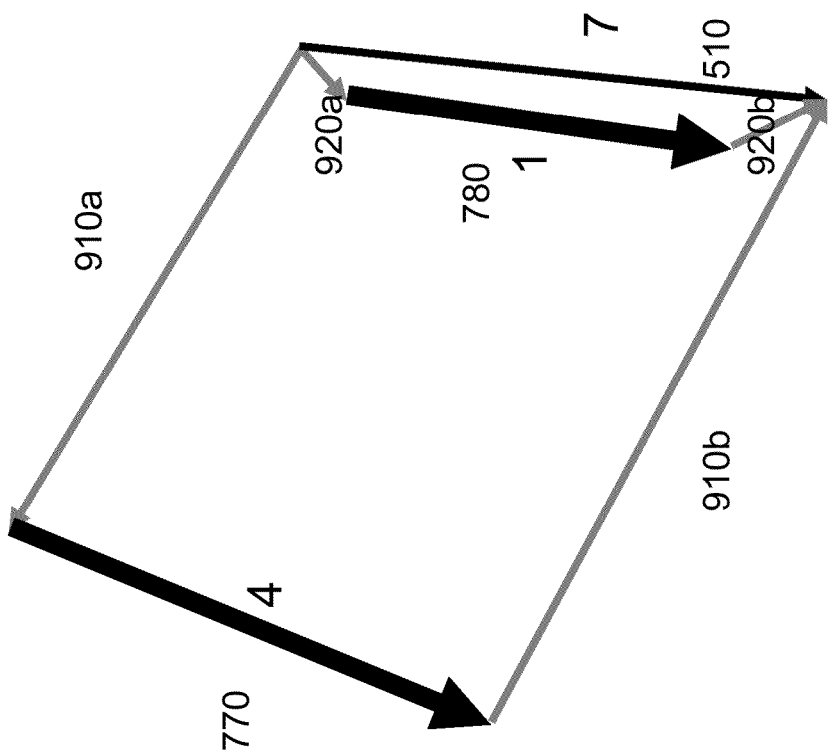
FIG. 9 depicts one or more aspects of an embodiment of the present invention.

After selecting the routes within the angular acceptance zone, the computer program product determines the distance from the start point of the new route to the start point of each selected route, each route within the angular acceptance zone, and the distance from the end point of the new route to the end point of each selected route (S250). Thus, for each selected route, the computer program code has calculated two distance values, which can be understood as "out-of-the-way" distance values. FIG. 9 depicts an example of the calculation of the distance values.

Figure 10:
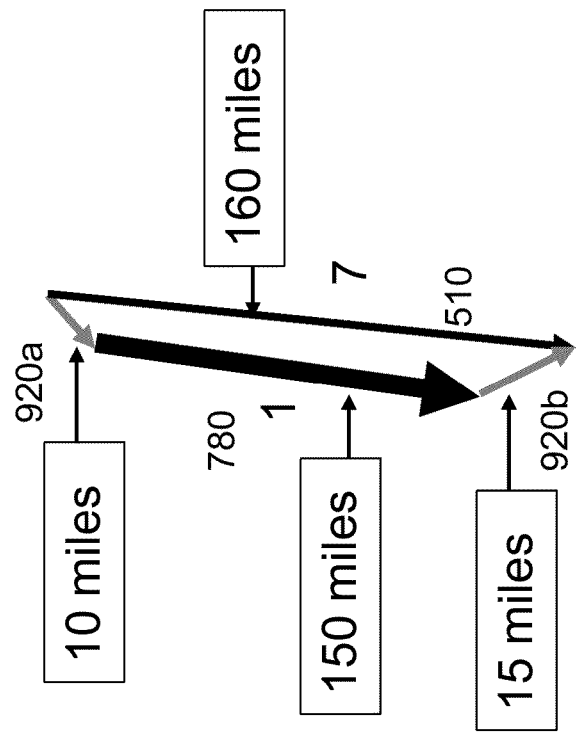
FIG. 10 depicts one or more aspects of an embodiment of the present invention.

Utilizing the calculated distances and a match threshold, which is discussed in greater detail in reference to FIG. 10 and Equations 1-2, computer program code in an embodiment of the present technique determines the convenience factor for each route within the angular tolerance zone (S260).

The computer program code returns to the user, the saved routes with qualifying convenience factors (S270). The computer program code can supply this result by displaying the results on the terminal, email, SMS, MMS, or using any other notification system known in the art. The computer program code that determines which routes have qualifying convenience factors is discussed in greater detail with reference to FIG. 10 and Equations 1-2.

Figure 3:
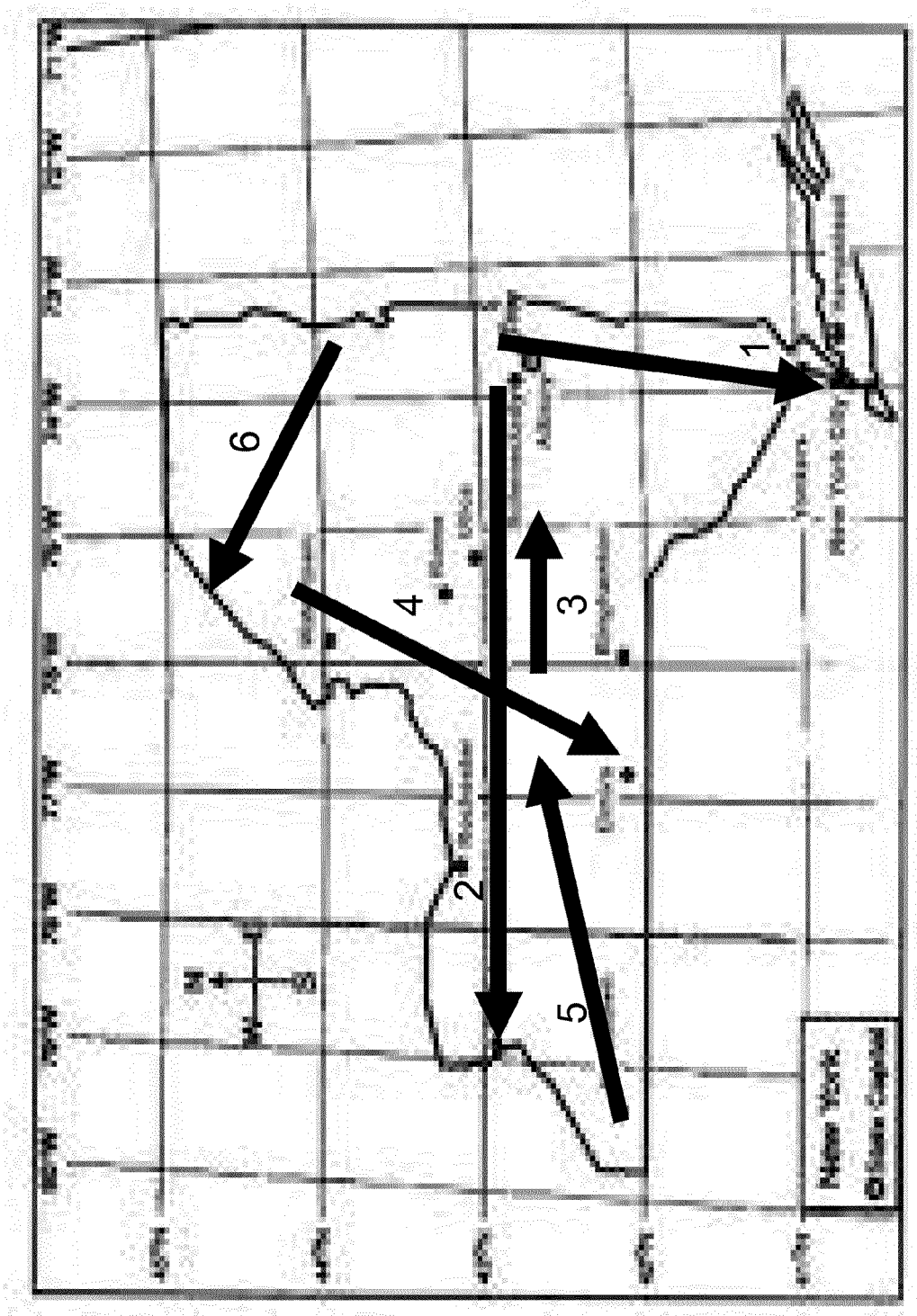
FIG. 3 depicts one or more aspects of an embodiment of the present invention.

FIG. 3 illustrates an aspect of an embodiment of the technique. FIG. 3 is map of New York 300 superimposed with routes 1-6 entered by users utilizing terminals 120a-120e and retained by the computer program code executing on one or more resources of the computer system 110 and saved on one or more memory resources of the computer system 110. The number of routes depicted in FIG. 3 are examples. The number of routes is unlimited.

In FIG. 3, the routes 1-6 are represented as vectors, each having a magnitude and angle. The computer program code determines the angle of each route by comparing it to a pre-defined configurable direction. In the embodiment of FIG. 3, the computer program code determines the angles of each route by comparing the direction of each route to the direction of due East. The computer program obtains the direction of each route as pointing from the departure point to the arrival point.

Figure 4:
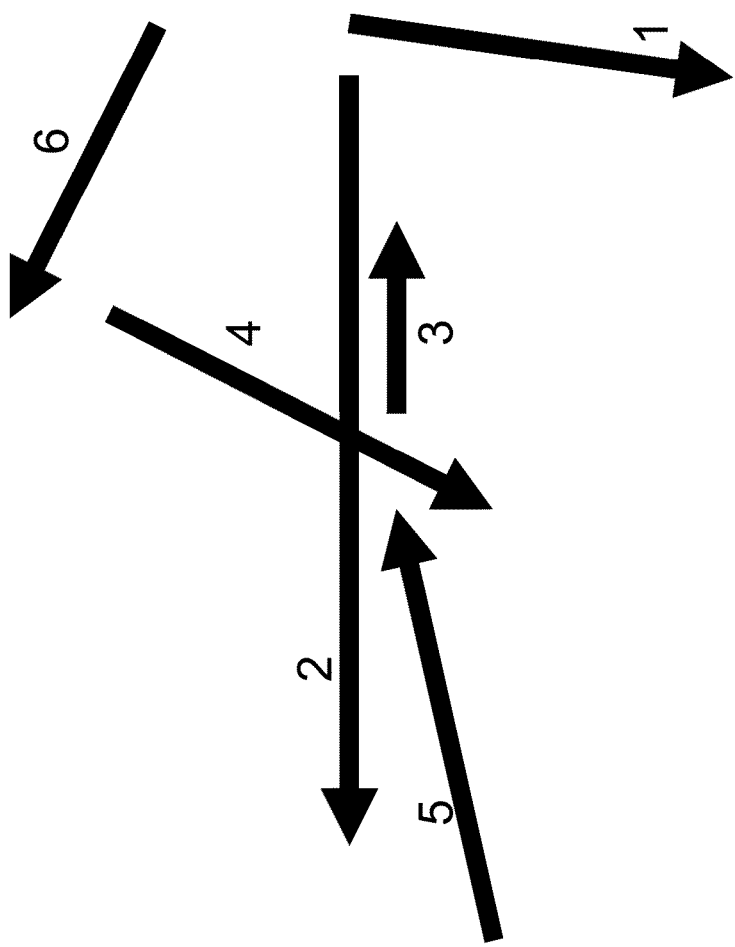
FIG. 4 depicts one or more aspects of an embodiment of the present invention.

For clarity, FIG. 4 displays the routes 1-6 of FIG. 3 without the map 300 in the background.

In an embodiment of the present technique, the vectors displayed in FIGS. 3-4 represent routes 1-6 that have been entered by users and retained on a memory resource for comparison with subsequently entered routes.

In addition to retaining previously entered routes, the computer program code also has a preconfigured angular acceptance zone. The angular acceptance zone, which is configurable by a user accessing the program through, for example, a terminal 120a-120e. The angular acceptance zone represents the maximum angular deviation of one route from another route wherein the computer program code will still determine that these two routes are "convenient" to each other. Put plainly, potentially convenient routes must have an angle that fits inside the angular acceptance zone. The angular acceptance zone is explained in greater detail in reference to FIG. 6.

Figure 5:
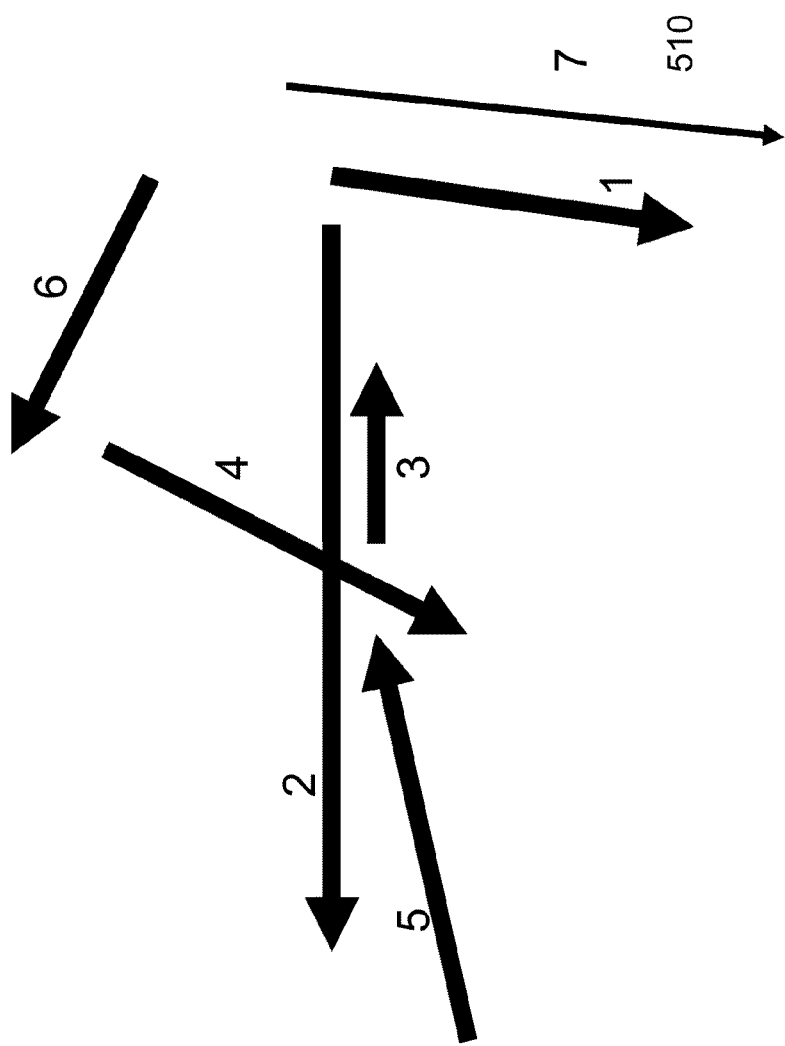
FIG. 5 depicts one or more aspects of an embodiment of the present invention.

As seen in FIG. 5, a user enters a new route 510 using a terminal 120a-120e. Upon obtaining the new route 510, which comprises at least a starting point and a destination, entered as addresses, coordinates, etc., the computer program code executed on, for example, the computer system 110, compares the new route 510, to the existing routes 1-6 retained on a memory resource, such as a database.

Figure 6:
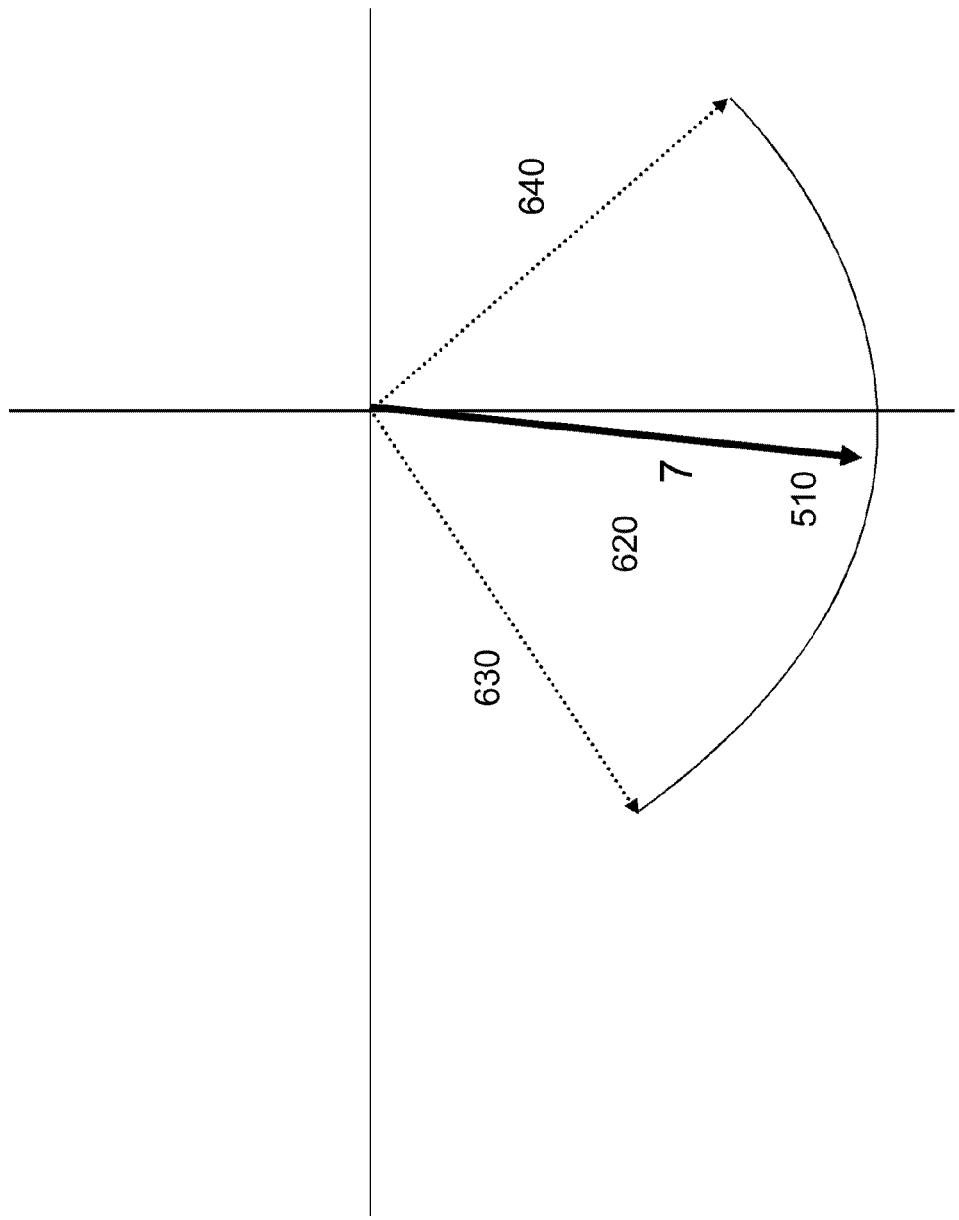
FIG. 6 depicts one or more aspects of an embodiment of the present invention.

As shown in FIG. 6, applying the angular acceptance zone, the computer program code creates an angular filter 620 based on the angle of the new route 510. As shown in FIG. 6, an exemplary embodiment of the present technique, potentially convenient routes must have an angle that fits inside the angular acceptance zone 620. In FIG. 6, a first potential route 630 and a second potential route 640 represent the angular largest deviation from the new route 510 that the computer program code will identify as convenient.

Figure 7:
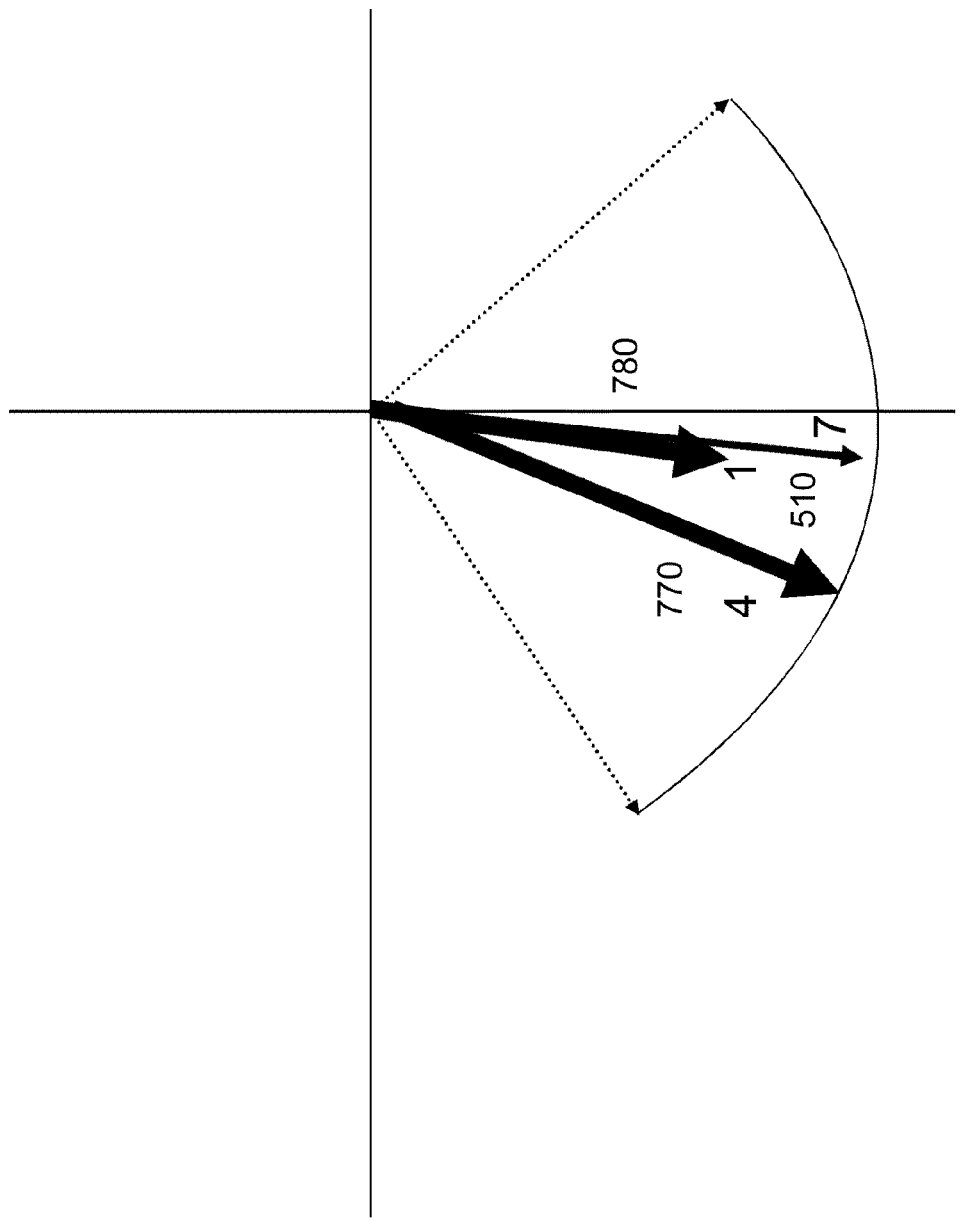
FIG. 7 depicts one or more aspects of an embodiment of the present invention.

Referring to FIG. 7, of the existing routes previously entered by users, the computer program utilizes the vectors representing the existing saved routes and identifies a first route 770 and a second route 780 as both having angles that fit inside the angular acceptance zone of the new route 510. In an embodiment of the present technique, the computer program code further evaluates the routes, in this example, the first route 770 and the second route 780 that fall inside the angular acceptance zone.

Figure 8:
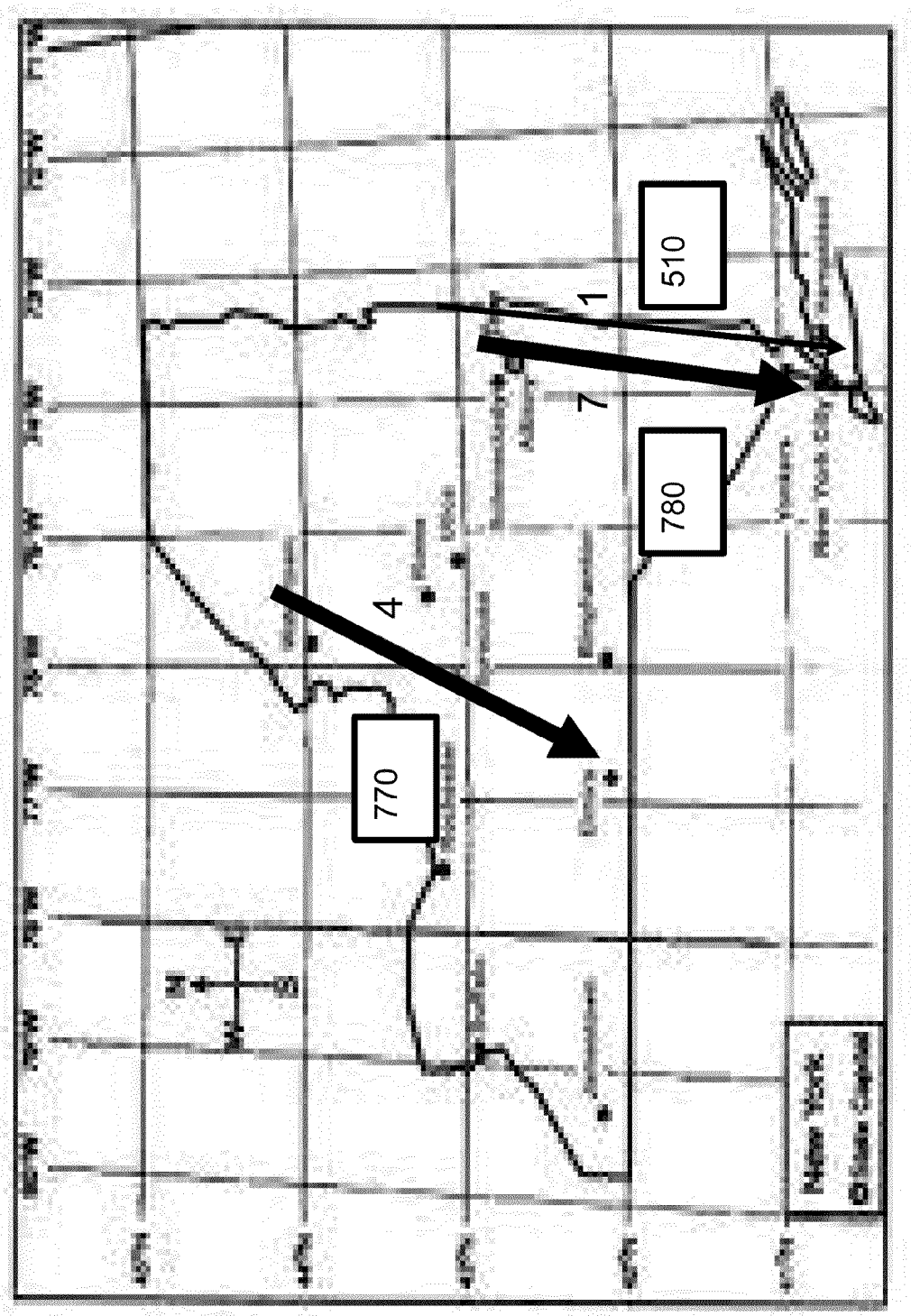
FIG. 8 depicts one or more aspects of an embodiment of the present invention.

FIG. 8 depicts the first route 770 and the second route 780 as well as the new route 510 as they appear on a map of New York State. Note that in this embodiment, the computer program code has selected the first route 770 and the second route 780 because they fall within a preconfigured angular acceptance zone, even though the routes are geographically separate.

In the embodiment of the technique, in addition to isolating routes utilizing the aforementioned angular analysis, the computer program code further filters potential routes based on the distances the person entering the new route 510 must go out of his or her way to accommodate the existing route in the database. In FIG. 9, lines 910a-910b represents this distance between the new route 510 and the first route 770 and lines 920a-920b represent this distance between new route 510 and the second route 780. A shorter distance is more convenient for the user and hence, the computer program code associates a greater convenience factor when a closer route is higher.

In an embodiment of the present invention, as calculated by the computer program code, the total distance a user travels is the length of the route retained on a memory resource, for example the first route 770 or the second route 780, plus the sum of the lengths of the two virtual routes, for example line 910a-910b for the first route 770 and lines 920a-920b for the second route.

Once the computer program code calculates the total distances, the length of the entered route is divided by the total distance and is multiplied by 100. The result is termed a convenience factor (CF), which is a quantitative number representing the convenience of a route.

The range of convenience factors that represent potential alternate (shared) routes for a user who entered a new route 510, can be a static variable or can be configured by a user. This term can be referred to as a match threshold (MT). The computer program code applies the MT to the convenience factors for potential routes in determining whether to recommend a given route to a user, via a client application, such as a web browser, running on the terminal 120a-120e utilized by that user.

If the computer program code determined that the CF is greater than a match threshold (MT), then the route is shown to the user, and the convenience factor is shown to the user. In the example below, the MT is 90%.

As explained above, a route is convenient if the CF is greater than, in the example below, the MT. Equation 1 depicts the computer program code calculating a convenience factor and comparing it to an MT of 0.90.

$$\{(\text{length of new route})/(\text{length of saved route}) + (\text{length of distance from departure point of saved route to departure point of new route}) + (\text{length of distance from arrival point of saved route to arrival point of new route})\} > 0.90 \quad \text{Equation 1}$$

Equation 2 utilizes sample data in Equation 1. The values in these equations are non-limiting examples. The values in Equation 2 represent those depicted in FIG. 10. Referring to FIG. 10, it depicts the new route 510, the second route 780 and lines 920a-920b, which represent the distances between the starting and ending points of the new route 510 to the starting and ending points of the second route 780. As seen in FIG. 10, the length of the new route 510 is 160 miles. Line 920a is 10 miles while line 920b is 15 miles. The second route is 150 miles. Thus, when Equation 1 is populated with values from this non-limiting example, the result is Equation 2.

$$\{(160 \text{ miles})/(150 \text{ miles} + 10 \text{ miles} + 15 \text{ miles})\} = 0.914$$

$$0.914 > 0.90$$

In the example from FIG. 10, the computer program code finds that the second route 780 convenient to the user who entered the new route 510 because the convenience factor of the second route, 0.914, is greater than the match threshold of 0.90. In an embodiment of the present invention, the second route 510 is displayed to the user who entered the new route 510. Because the first route 770 is more distant from the new route 510, its convenience factor will fall below the threshold and the computer program code will not display the first route to the user.

In an embodiment of the present invention, when the computer program code determined that more than one route has a qualifying convenience factor, the computer program code displays the qualifying routes. The routes can all be displayed together and/or ranked according to their respective convenience factors and/or using any display and/or listing familiar to one of skill in the art.

The embodiments discussed with reference to the FIGS. 1-10 refer to travelers choosing to share rides by finding routes with qualifying convenience factors. However, one of skill in the art will recognize applications for the present method beyond this ride sharing example. For example, a user looking to ship goods for a given route could use an embodiment of the present invention to locate a user who intends to travel a route with a qualifying convenience factor, where this user is able to haul the goods of the first user. In an embodiment of the present invention where a user desires to transport goods, additional information may be obtained by the computer program, including the hauling capacity of the travel vehicle of each rider and whether it possesses certain qualities that accommodate specific goods, for example, is a given user traveling in a truck with refrigeration. In a further embodiment of the present invention, a user may indicate how much room he or she has for dedicated cargo in his or her vehicle. Users who locate and select rides with qualifying convenience factors may have the option to "fill" a certain amount of available space on the selected ride, so that the ride is shown as available, but with less space to accommodate cargo.

Although the embodiments in FIGS. 3-10 depict the routes as straight lines, in further embodiments of the present invention, routes may take on additional shapes, for example, routes may be curved, to match the curvature of the earth.

Figure 11:
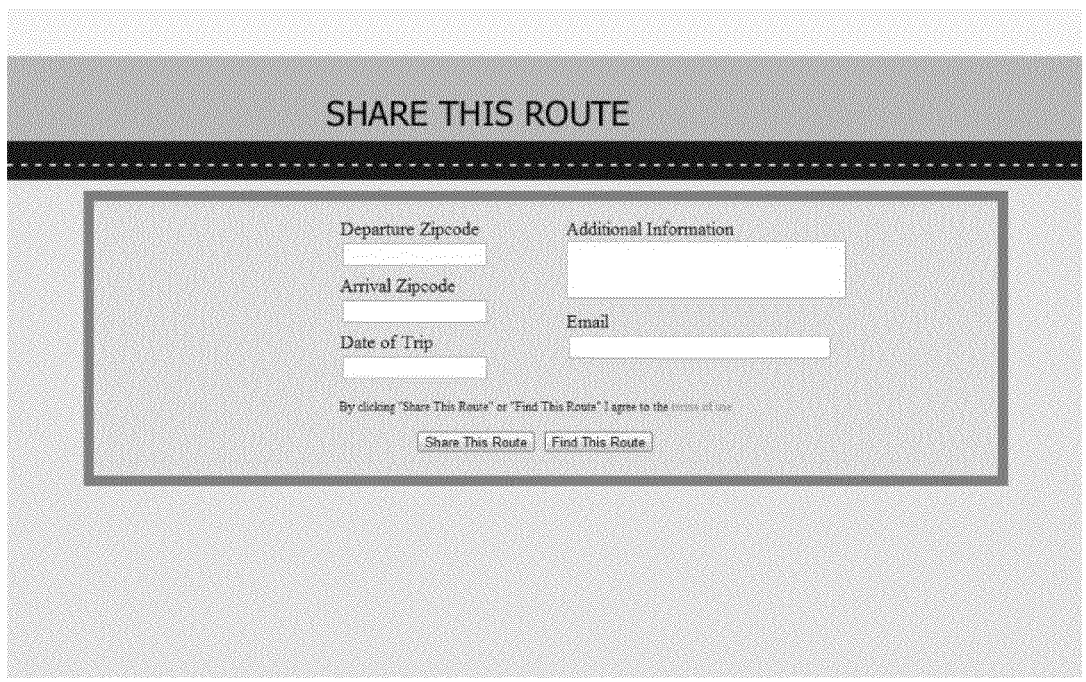
FIG. 11 depicts one or more aspects of an embodiment of the present invention.
Figure 12:
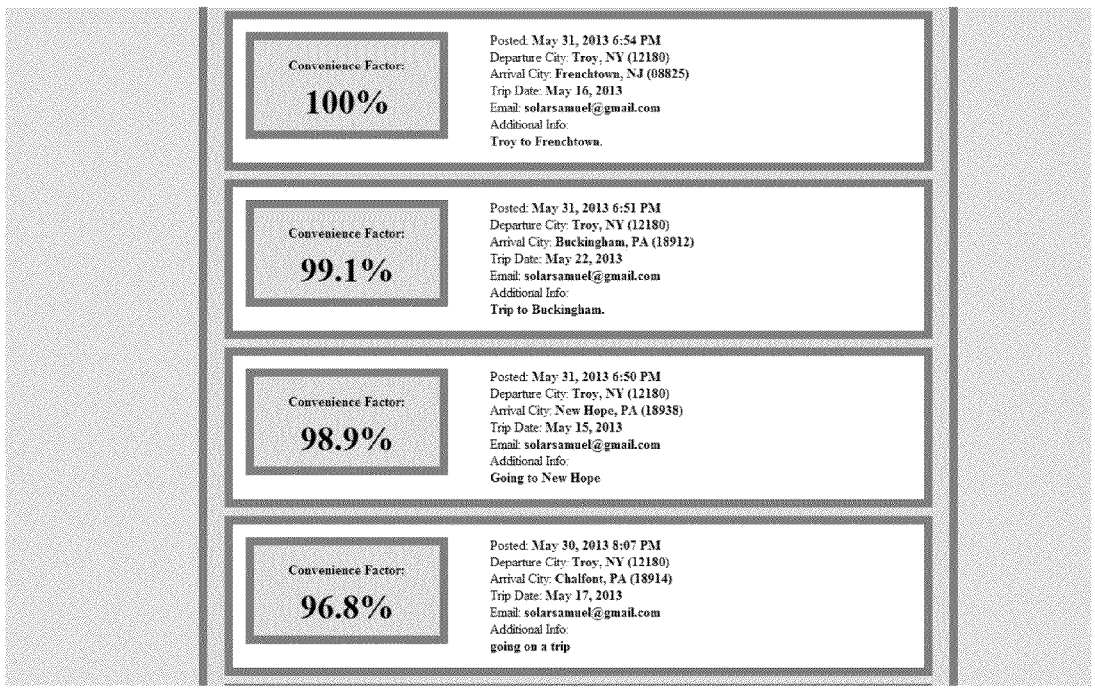
FIG. 12 depicts one or more aspects of an embodiment of the present invention.

FIGS. 11-12 depict screen shots of a software application, specifically the graphical user interface (GUI), depicting aspects of the present technique. In the description of these figures, reference will be made to the workflow of FIG. 2.

FIG. 11 is an example of a GUI and is not limiting. In FIG. 11, a user is requested to enter a departure zipcode and an arrival zipcode, in addition to the day that he or she intends to take the trip. The user can also enter additional information which some embodiments of the application can utilize to further limit the number of results for possible shares returned to the user. For example, if a first user enters that he or she intends to transport a dog on the trip and a second user writes that he or she is violently allergic to dogs, even if the route of the first user would be convenient to the second user, this route could be eliminated from the possible share opportunities presented to the user. As another example, a user could enter how many spaces for passengers (and/or how much space for cargo) is available for a given trip. Utilizing the zipcode to establish a starting point and an end point to a trip is just one example of a start point and an end point that can be accepted by differing embodiments of the present invention. One of skill in the art will recognize that geographic coordinates can be conveyed and accepted in a variety of ways.

Additionally, in an embodiment of the present invention, the terminal 120a-120b can be enabled with GPS and the starting point of the user accepted by the embodiment is the location of the user, as established by the GPS.

As discussed in reference to FIG. 2, after a user has entered a route and the application has obtained this route and determined convenient routes to this route, the application returns these candidate routes to the user. FIG. 12 is an example of an embodiment of the present invention displaying a group of candidate routes to a user who has entered a desired route. In this embodiment, the convenience of the routes displayed is denoted by percentages and are listed in by most convenient to least convenient. One of skill in the art will recognize that the routes can be displayed by embodiments of the application utilizing various graphical representations; FIG. 12 is one example.

Referring to FIG. 12, a user of a terminal 120a-120e, such as those in FIG. 1, enters route information. In this example, the GUI of FIG. 12 gives the user the choice of entered a route for sharing, allowing the application to obtain the route S210, or finding the route, i.e., requesting that the application search existing retained routes to see if any of these routes are convenient to the user (S240-S270).

In another embodiment of the present invention, when the computer program presents existing retained routes to a user, the user may select a route that he or she wishes to take. Upon selecting of the route, the computer program can notify user who entered that route that his or her route has been selected and, for example, can send this notified user information about the user who selected the route, including what accommodations the user requesting the route needs, for example, how many people will be traveling, what cargo will come with the user, etc. In an embodiment of the present invention, the computer program can track when a selected route is "full," i.e., the maximum capacity of the vehicle is full based upon selection by users, and remove the route from the pool of routes evaluated for sharing.

Figure 13:
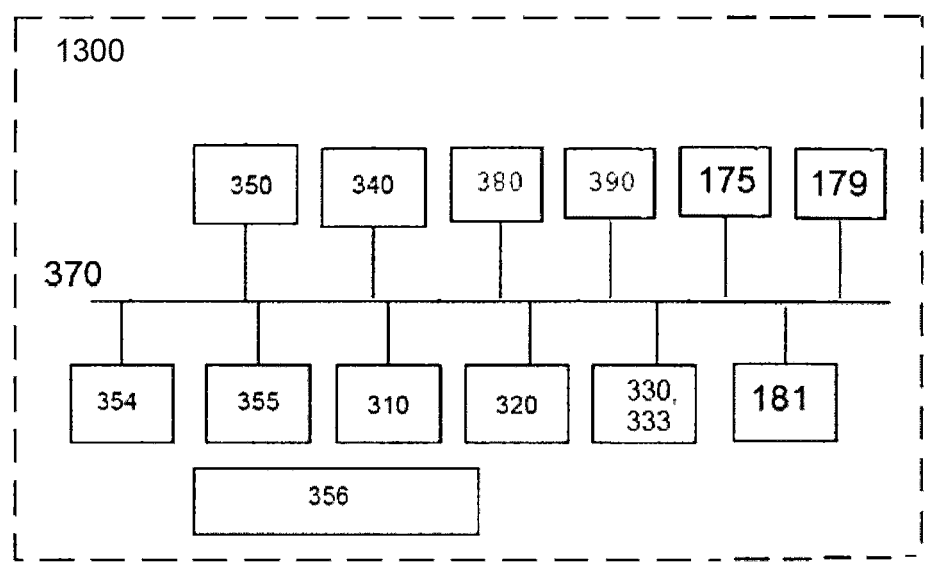
FIG. 13 depicts one embodiment of a single processor computing environment to incorporate and use one or more aspects of the present invention.

FIG. 13 illustrates a block diagram of a resource 1300 in computer system 110 and/or terminal 120a-120b, which is part of the technical architecture of certain embodiments of the technique. The resource 1300 may include a circuitry 370 that may in certain embodiments include a microprocessor 354. The computer system 1100 may also include a memory 355 (e.g., a volatile memory device), and storage 181. The storage 181 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 355 may comprise an internal storage device, an attached storage device and/or a network accessible storage device. The system 1100 may include a program logic 330 including code 333 that may be loaded into the memory 355 and executed by the microprocessor 356 or circuitry 370.

In certain embodiments, the program logic 330 including code 333 may be stored in the storage 181, or memory 355. In certain other embodiments, the program logic 333 may be implemented in the circuitry 370. Therefore, while FIG. 13 shows the program logic 333 separately from the other elements, the program logic 333 may be implemented in the memory 355 and/or the circuitry 370.

Figure 14:
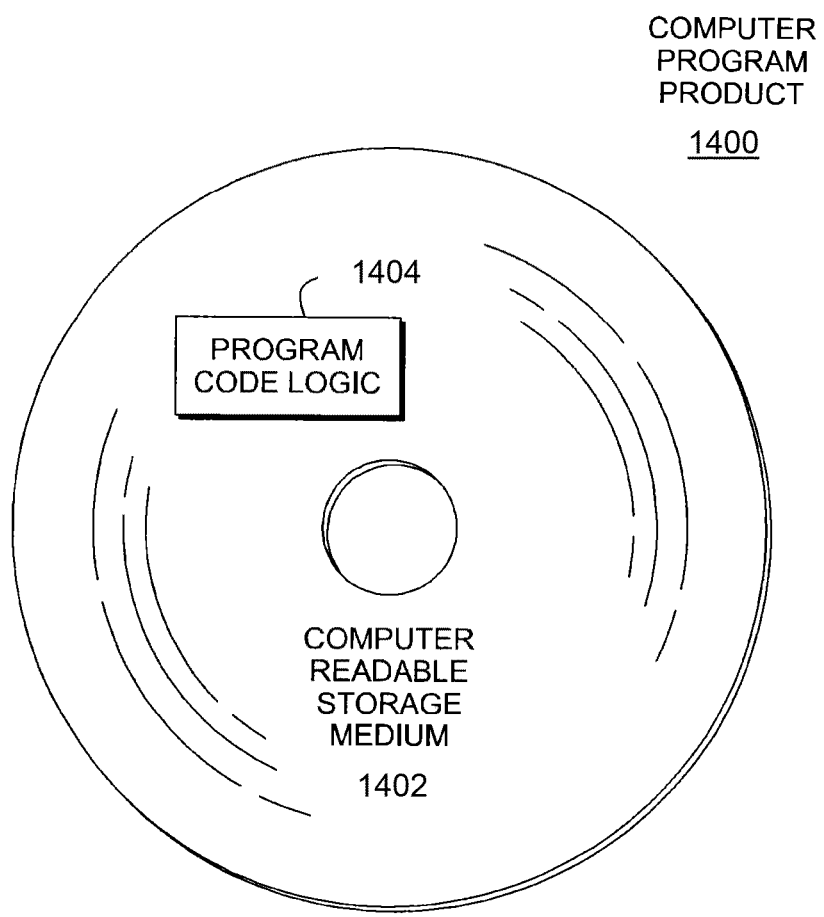
FIG. 14 depicts one embodiment of a computer program product incorporating one or more aspects of the present invention.

Using the processing resources of a resource 1300 to execute software, computer-readable code or instructions, does not limit where this code is can be stored. Referring to FIG. 14, in one example, a computer program product 1400 includes, for instance, one or more non-transitory computer readable storage media 1402 to store computer readable program code means or logic 1404 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for determining a convenient route, the computer program product comprising:
   a storage medium readable by a processor and storing instructions for execution by the processor to perform a method comprising:
      obtaining, by the processor, from a client over an Internet connection, a new route wherein the new route comprises a starting point and an ending point;
      based on the starting point and the end point, deriving, by the processor, a vector with a length and direction to represent the new route and retaining the vector with the starting point and the end point on a memory resource accessible to the processor, wherein the length represents a distance between the starting point and the end point;
      obtaining, by the processor, from the memory resource, a plurality of vectors associated with stored routes and comparing the plurality of vectors to the vector representing the new route to identify a portion of the plurality of vectors representing stored routes within a pre-defined angular deviation from the vector representing the new route;
      responsive to identifying the portion of the plurality of vectors representing stored routes, determining, by the processor a convenience factor for each of the stored routes represented by the portion of the plurality of vectors, wherein the determining comprises, for each stored route represented by the portion of the plurality of vectors:
         designating a location on each stored route;
         calculating a distance from the location to a location on the new route; and
         assigning the convenience factor to each stored route, wherein a magnitude of the convenience factor is inversely proportional to a magnitude of the distance;
      selecting, by the processor, from the stored routes represented by the portion of the plurality of vectors, at least one recommended route, based on the convenience factor of the at least one recommended route meeting a preconfigured threshold; and
      transmitting, by the processor, data from the memory resource related to the at least one recommended route to the client over the Internet connection, wherein responsive to receiving the data from the memory resource, a graphical user interface associated with an application executing on the client configures and displays the data on the client.

2. The computer program product of claim 1, wherein the calculating a distance from the location to a location on the new route comprises:
   calculating a first distance between a first point in the new route and a first point in each stored route and a second distance between a second point in the new route and a second point in each stored route and comparing the first distance and the second distance with a third distance.

3. The computer program product of claim 2, wherein the assigning the convenience factor to each stored route further comprises:
   determining a stored route distance for each stored route based on a length of a vector from the portion of the plurality of vectors representing a stored route; and
   comparing the distance of the new route to a combination of the first distance, the second distance and each stored route distance.

4. The computer program of claim 1, wherein the angular deviation from the vector representing the new route comprises a geographic area.

5. The computer program product of claim 4, wherein the angular deviation from the vector representing the new route is dynamic based upon a location of the obtained route.

6. The computer program product of claim 1, wherein the comparing the distance of the new route to the combination comprises:
   determining a combined distance comprising the first distance, the second distance and a stored route distance; and
   dividing the distance of the new route by the combined distance, wherein a resulting quotient comprises the convenience factor of the stored route.

7. A computer system for determining a convenient route, the computer system comprising:
   a memory; and
   a processor, in communications with the memory, wherein the computer system is configured to perform a method comprising:
      obtaining, by the processor, from a client over an Internet connection, a new route wherein the new route comprises a starting point and an ending point;
      based on the starting point and the end point, deriving, by the processor, a vector with a length and direction to represent the new route and retaining the vector with the starting point and the end point in the memory, wherein the length represents a distance between the starting point and the end point;
      obtaining, by the processor, from the memory, a plurality of vectors associated with stored routes and comparing the plurality of vectors to the vector representing the new route to identify a portion of the plurality of vectors representing stored routes within a pre-defined angular deviation from the vector representing the new route;
      responsive to identifying the portion of the plurality of vectors representing stored routes, determining, by the processor a convenience factor for each of the stored routes represented by the portion of the plurality of vectors, wherein the determining comprises, for each stored route represented by the portion of the plurality of vectors:
         designating a location on each stored route;

calculating a distance from the location to a location on the new route; and assigning the convenience factor to each stored route, wherein a magnitude of the convenience factor is inversely proportional to a magnitude of the distance;

selecting, by the processor, from the stored routes represented by the portion of the plurality of vectors, at least one recommended route, based on the convenience factor of the at least one recommended route meeting a preconfigured threshold; and transmitting, by the processor, data from the memory resource related to the at least one recommended route to the client over the Internet connection, wherein responsive to receiving the data from the memory resource, a graphical user interface associated with an application executing on the client configures and displays the data on the client.

8. The computer system of claim 7, wherein the calculating a distance from the location to a location on the new route comprises:

calculating a first distance between a first point in the new route and a first point in each stored route and a second distance between a second point in the new route and a second point in each stored route and comparing the first distance and the second distance with a third distance.

9. The computer system of claim 8, wherein the assigning the convenience factor to each stored route further comprises:

determining a stored route distance for each stored route based on a length of a vector from the portion of the plurality of vectors representing a stored route; and comparing the distance of the new route to a combination of the first distance, the second distance and each stored route distance.

10. The computer system of claim 7, wherein the angular deviation from the vector representing the new route comprises a geographic area.

11. The computer system of claim 10, wherein the angular deviation from the vector representing the new route is dynamic based upon a location of the obtained route.

12. The computer system of claim 7, wherein the comparing the distance of the new route to the combination comprises:

determining a combined distance comprising the first distance, the second distance and a stored route distance; and dividing the distance of the new route by the combined distance, wherein a resulting quotient comprises the convenience factor of the stored route.

13. A method for determining a convenient route comprising:

obtaining, by a processor, from a client over an Internet connection, a new route wherein the new route comprises a starting point and an ending point;

based on the starting point and the end point, deriving, by the processor, a vector with a length and direction to represent the new route and retaining the vector with the starting point and the end point on a memory resource accessible to the processor, wherein the length represents a distance between the starting point and the end point;

obtaining, by the processor, from the memory resource, a plurality of vectors associated with stored routes and comparing the plurality of vectors to the vector representing the new route to identify a portion of the plurality of vectors representing stored routes is within a predefined angular deviation from the vector representing the new route;

responsive to identifying the portion of the plurality of vectors representing stored routes, determining, by the processor a convenience factor for each of the stored routes represented by the portion of the plurality of vectors, wherein the determining comprises, for each stored route represented by the portion of the plurality of vectors:

designating a location on each stored route;

calculating a distance from the location to a location on the new route; and assigning the convenience factor to each stored route, wherein a magnitude of the convenience factor is inversely proportional to a magnitude of the distance;

selecting, by the processor, from the stored routes represented by the portion of the plurality of vectors, at least one recommended route, based on the convenience factor of the at least one recommended route meeting a preconfigured threshold; and transmitting, by the processor, data from the memory resource related to the at least one recommended route to the client over the Internet connection, wherein responsive to receiving the data from the memory resource, a graphical user interface associated with an application executing on the client configures and displays the data on the client.

14. The method of claim 13, wherein the calculating a distance from the location to a location on the new route comprises:

calculating a first distance between a first point in the new route and a first point in each stored route and a second distance between a second point in the new route and a second point in each stored route and comparing the first distance and the second distance with a third distance.

15. The method of claim 14, wherein the assigning the convenience factor to each stored route further comprises:

determining a stored route distance for each stored route based on a length of a vector from the portion of the plurality of vectors representing a stored route; and comparing the distance of the new route to a combination of the first distance, the second distance and each stored route distance.

16. The method of claim 13, wherein the angular deviation from the vector representing the new route comprises a geographic area.

17. The method of claim 16, wherein the angular deviation from the vector representing the new route is dynamic based upon a location of the obtained route.

18. The method of claim 13, wherein the comparing the distance of the new route to the combination comprises:

determining a combined distance comprising the first distance, the second distance and a stored route distance; and dividing the distance of the new route by the combined distance, wherein a resulting quotient comprises the convenience factor of the stored route.

* * * * *